(No Model.)

T. W. BREEN.
GARDENING IMPLEMENT.

No. 467,364. Patented Jan. 19, 1892.

Witnesses:
E. A. Brandau
W. D. Bent Jr.

Inventor:
Thomas W. Breen
By his atty
John Richards

UNITED STATES PATENT OFFICE.

THOMAS W. BREEN, OF SAUCELITO, CALIFORNIA.

GARDENING IMPLEMENT.

SPECIFICATION forming part of Letters Patent No. 467,364, dated January 19, 1892.

Application filed March 25, 1891. Serial No. 386,355. (No model.)

*To all whom it may concern:*

Be it known that I, THOMAS W. BREEN, of Saucelito, county of Marin, and State of California, have invented a new and useful Gardening Implement; and I hereby declare the following to be a full, true, and exact description of the same with its method of use and objects.

My invention relates to an implement to be used in extracting weeds or plants in gardens or elsewhere in cases where the hands have to be used for that purpose; and it consists in a thimble or sheath, made of thin metal, that will fit over the forefinger, or in some cases over two or more fingers, terminating at its closed end in a blade or spoon-shaped implement to be employed in digging out and removing weeds or plants, saving the fingers from injury, and also rendering the process more effectual and easy. The implement also secures the removal of the roots of weeds that are commonly left in the ground when they are pulled up by the tops in the usual manner.

Figure 1:
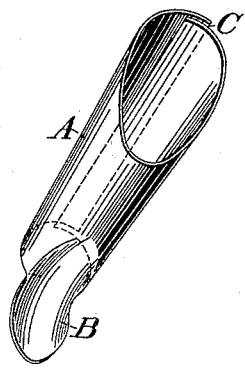
Figure 2:
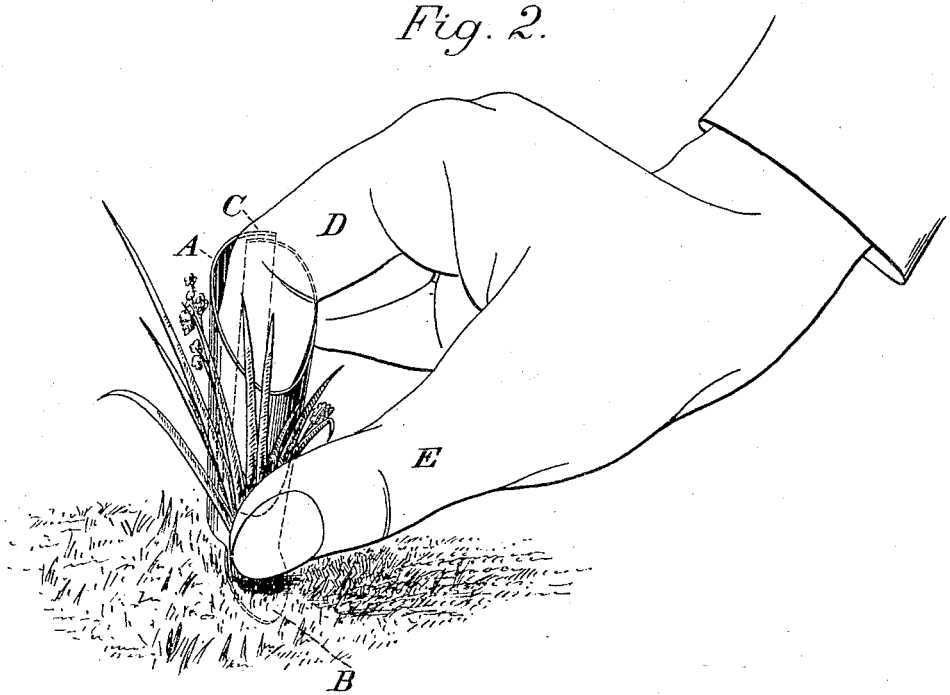

Referring to the drawings, Figure 1 is a perspective view of one of my gardening implements or weeding-thimbles, and Fig. 2 shows the method of using the same in extracting weeds or plants.

The implement is made, preferably, of a single piece of sheet metal cut to such form as will constitute the main thimble A, closed at its extreme or smaller end, and the spoon-shaped extension B, the whole bent into form, as shown in Fig. 1, the top or larger end being oblique to the axis, so that the extreme point will extend above the second joint of the finger, and thus give strong support in working. The joint at C can be formed by soldering or left unjoined, as shown in the drawings. In the latter case the size of the thimble portion A can be altered to some extent by springing the metal, so as to fit on fingers of different size, and thus avoid the necessity of a particular size to fit in each case. The bottom end of the sheath or thimble A is closed by turning over the metal of the sides or by a separate piece inserted.

The implement may also be cast or drawn in one piece without the seam C. These are matters of construction not essential to or forming part of my invention, which I have shown in its most simple form made of one piece of sheet metal.

In Fig. 2 it is shown how the spade or spoon-shaped end B of the implement is inserted beneath a plant when the thimble A is on the forefinger D and the thumb E is pressed against the front. In this manner a weed or plant is removed with all of its roots, and, in case of a plant, with so much of the adhering earth as is desired.

The implement can be used with gloves the same as when the hands are bare, in which case the hand is not even soiled in the process of weeding or transplanting, and there is no injury to the finger-nails or otherwise.

Having thus described the nature and objects of my invention, what I claim as new, and desire to secure by Letters Patent, is—

The herein-described gardening implement, consisting of a hollow tapering thimble closed at its smaller end and split longitudinally to provide overlapping edges to permit adjustment of the thimble to fingers of different sizes, said thimble having its upper end cut obliquely to the axis thereof, so that the extreme point may extend above the second joint of the operator's finger, to give a steady support, and the downwardly-curved spoon extension B, integral with the closed end of the device and projecting downward from said end substantially as a continuation of the end of the thimble, substantially as and for the purpose set forth.

In testimony whereof I have hereunto affixed my signature in the presence of two witnesses.

THOMAS W. BREEN.

Witnesses:
 W. A. ALLEN,
 W. D. BENT, Jr.